Dec. 12, 1967 H. A. STOVER 3,358,234
SSB SYSTEM WHICH OVERCOMES PROBLEMS OF SQUELCH, IMPULSE
INTERFERENCE AND AGC AS COMMONLY ENCOUNTERED
Filed April 2, 1965 4 Sheets-Sheet 1

INVENTOR.
HARRIS A. STOVER
BY Moody & Gallagher
ATTORNEYS

INVENTOR.
HARRIS A. STOVER
BY Toody & Gallacher
ATTORNEYS

INVENTOR.
HARRIS A. STOVER
BY Moody & Gallagher
ATTORNEYS

Dec. 12, 1967 H. A. STOVER 3,358,234

SSB SYSTEM WHICH OVERCOMES PROBLEMS OF SQUELCH, IMPULSE INTERFERENCE AND AGC AS COMMONLY ENCOUNTERED

Filed April 2, 1965 4 Sheets-Sheet 4

INVENTOR.
HARRIS A. STOVER

BY Mrocky & Kallacher

ATTORNEYS

United States Patent Office 3,358,234

Patented Dec. 12, 1967

3,358,234

SSB SYSTEM WHICH OVERCOMES PROBLEMS OF SQUELCH, IMPULSE INTERFERENCE AND AGC AS COMMONLY ENCOUNTERED

Harris A. Stover, Cedar Rapids, Iowa, assignor to Collins Radio Company, Cedar Rapids, Iowa, a corporation of Iowa

Filed Apr. 2, 1965, Ser. No. 445,148
2 Claims. (Cl. 325—330)

ABSTRACT OF THE DISCLOSURE

The system herein described is based on the fact that when the carrier level of a single sideband transmitter is reduced by a controlled amount, such as 10 or 15 db, the carrier will not contain sufficient power to effectively reduce the sideband power available for voice communications but will still be of sufficient strength to control squelch, AGC, and impulse interference of the system. Two systems for accomplishing this at the transmitter are shown. The first system modifies the well-known single sideband transmitter by bypassing the oscillator output around the balanced modulator and partially suppressing the carrier frequency in the bypassing circuit. The second system adjusts the frequency relationship between the oscillator and the sideband filter to provide the desired amount of carrier attenuation on the skirt of the sideband filter.

This invention relates generally to an improved radio system and particularly to a single sideband communication system which overcomes problems of squelch, impulse interference and automatic gain control (AGC).

There are two problems associated with single sideband radio communication systems which sometimes limit their usefulness for particular applications. One of these is the problem of providing a satisfactory squelch system to inactivate the receiver when no signal is being received but to properly activate it when a signal is being received. The other is the susceptibility of most SSB (single sideband) receiving systems to impulse type noise of large amplitude.

The problem of squelch arises due to the syllabic envelope characteristic of the single sideband transmission and this very property has been used in at least one system to provide a method of squelch. The system described herein has greater immunity to noise and at the same time reduces the effect of impulse noise.

The problem of impulse noise is compounded in a single sideband system because of the common practice of using an automatic gain control system with a very fast attack time but a slow decay time. Thus when a noise impulse hits, it drives the receiver gain down. A sequence of noise impulses may reduce the audio output of the receiver to uselessness.

Single sideband systems usually transmit either the upper sideband or the lower sideband while the carrier and the unwanted sideband are suppressed as much as can be practically achieved. The carrier is usually suppressed more than 60 db. The suppression of the carrier is desirable for two reasons. First, transmission of the carrier reduces the transmitter power available for useful communications since the carrier in itself does not carry the voice information. Second, if the carrier used in the receiver product detector differs somewhat from the transmitted carrier an annoying beat between the transmitted carrier and the receiver carrier is produced in the detector.

This invention shows how the transmission of a predetermined amount of the carrier can be used to overcome the squelch and impulse noise problems without significantly effecting the amount of transmitter power available for voice communications while at the same time overcoming the problem of the undesirable beat between the transmitted carrier and the one generated in the receiver.

It is therefore an object of this invention to provide a SSB system which overcomes problems of squelch, impulse interference and automatic gain control.

It is another object of this invention to achieve these advantages by the transmission of a suppressed carrier frequency.

Another object is to provide such a SSB system in which the carrier is suppressed by a predetermined amount such that it doesn't significantly affect the amount of power available to the voice sideband.

Still another object is the provision of a SSB system in which the receiver AGC and squelch are operated by the suppressed carrier so that they are independent of attack and decay times and also of syllabic fluctuations of the single sideband signal.

Further objects, features, and advantages of the invention will become apparent from the following description and claims when read in view of the accompanying drawings, in which:

The inventive system is based on the fact that with the carrier level reduced by a controlled amount such as ten or fifteen db it will not contain sufficient power to effectively reduce the sideband power available for voice communications but will still be of sufficient strength to control squelch, AGC and impulse interference. Two systems for accomplishing this at the transmitter are shown in FIGURES 1 and 2.

Figure 1:
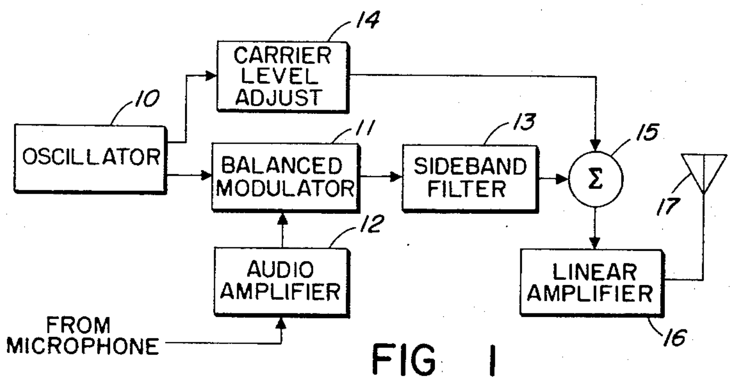
FIGURE 1 shows one system for transmitting a suppressed carrier.
Figure 2:
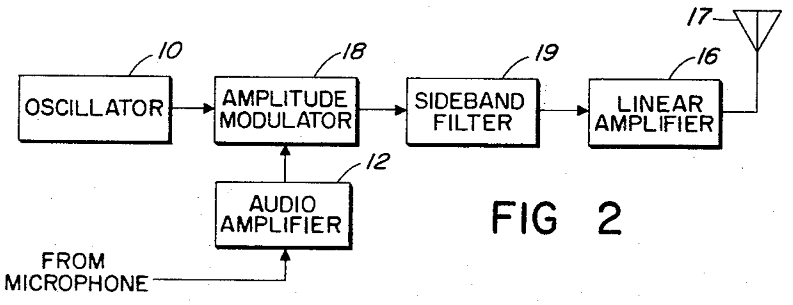
FIGURE 2 shows an alternative system for transmitting a suppressed carrier.

FIGURE 1 shows the usual SSB generation system and the modifications thereof, which render it suitable for the transmission of a suppressed carrier. The usual SSB system consists of an oscillator 10, a balanced modulator 11, a sideband filter 13, an audio amplifier 12, a linear amplifier 16 and an antenna 17. The balanced modulator 11 is fed by the oscillator 10 and amplifier 12 and thereby provides a double sideband signal with the carrier suppressed. Filter 13 receives the modulator 11 output and removes the unwanted sideband (either the high or the low frequency sideband) and further attenuates the carrier. In accordance with the inventive concept a carrier level adjust 14 and summing network 15 are added to the standard system. Carrier level adjust 14 is an amplifier or attenuator which is provided with a gain adjust so that the desired carrier level is fed to summing network 15. Because part of tne carrier is paralleled around the filter it is not suppressed thereby and consequently a higher and more accurately controlled level carrier is passed to the transmitter antenna 17 with the inventive system than with the prior art system. The level of carrier transmittal is controlled by carrier level adjust 14 such that it is attenuated by approximately 10 or 15 db. The transmitting system of FIGURE 1 can be modified by adding a clipper and a second sideband filter between sideband filter 13 and summing network 15. The clipping effectively reduces the power rating of the transmitter required to provide a given communications channel or alternatively increases the communications capability of a transmitter of a given power. The advantages of such clipping are pointed out in several references of which the following two are desirable to mention:

Craiglow, R. L., et al., "Power Requirements for Speech Communications Systems," IRE Transactions on Audio pp. 186–190, November-December 1961.

Shyne, N. A., "Speech-Signal Processing and Applications in Single Sideband," Electronics Research Laboratory, Montana State College, Bozeman, Mont. March 1962.

Figure 6:
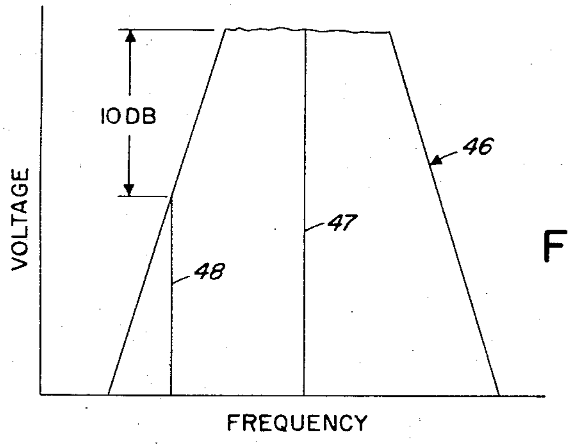
FIGURE 6 shows the output waveform of a sideband filter.

FIGURE 2 shows another system for producing the desired carrier level. In this system the output from oscillator 10 is amplitude modulated by modulator 18 producing the normal double sideband amplitude modulated signal with a constant carrier level. The sideband filter 19 removes the unwanted sideband. The frequency relationship between the oscillator 10 and the sideband filter 19 is adjusted to provide the desired amount of attenuation of the carrier on the skirt of the sideband filter. This can be understood by reference to FIGURE 6, which shows the band pass of sideband filter 19. The sideband filter 19 is designed to have a passband 46 with a center frequency as indicated by line 47. The carrier frequency is indicated by line 48. It is therefore evident that by properly selecting the frequency separation of the carrie and the filter center frequency the carrier can be attenuated any desired amount. It should be noted that the carrier can be a higher frequency than the filter center frequency and still obtain the same result. Other systems for adjusting the carrier level may also be apparent to one skilled in the art.

The transmitting system used may be designed such that it assures the transmission of the suppressed carrier a sufficient time prior to the voice (sideband) transmission to permit the receiver to lock on to the carrier before sideband transmission is received. The sideband frequency is normally at a higher power level than the carrier.

Figure 3:
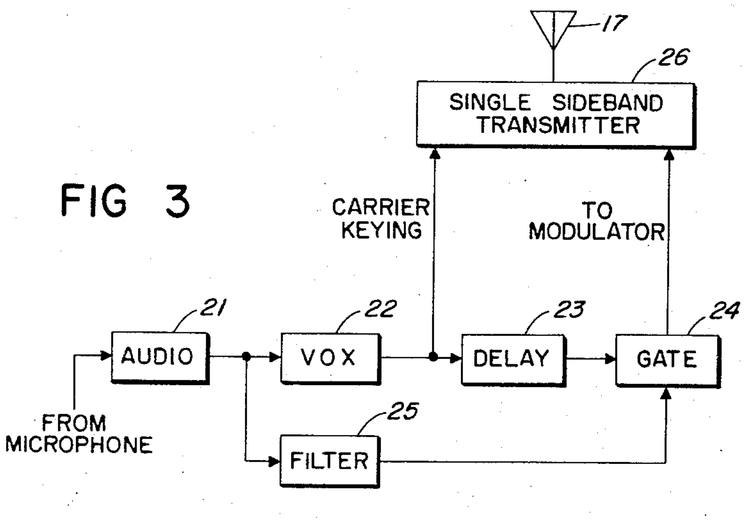
FIGURE 3 shows a SSB transmitter which can use the system of either FIGURE 1 or FIGURE 2.

A transmitting system of this type is shown in FIGURE 3. The output from audio amplifier 21 is fed to voice operated relay (VOX) 22 and filter 25. The VOX 22 output (switching signal) feeds both the oscillator of SSB transmitter 26 and delay 23. Gate 24 which feeds the modulator of SSB transmitter 26 is fed by delay 23 and filter 25. SSB transmitter 26 can be either of the systems shown in FIGURES 1 and 2. VOX 22 can be replaced with a push-to-talk (PTT) switching means.

Audio from the microphone (not shown) is fed through amplifier 21 to voice operated relay 22. The output of VOX 22 actuates oscillator 10 (FIGURES 1 and 2) and thereby turns on the carrier of the single sideband transmitter 26. This output is delayed by delay circuit 23 before triggering the gate 24. Triggering gate 24 permits voice to be applied to the modulator of the transmitter 26. Thus the carrier is present at the receiver a sufficient time (a fraction of a second) prior to the voice signal to permit the receiver to obtain phase lock. The filter 25 is included to remove the very low audio frequencies that are not required for communications but which could knock the receiver out of lock if the phase locked loop bandwidth were too great.

Figure 4:
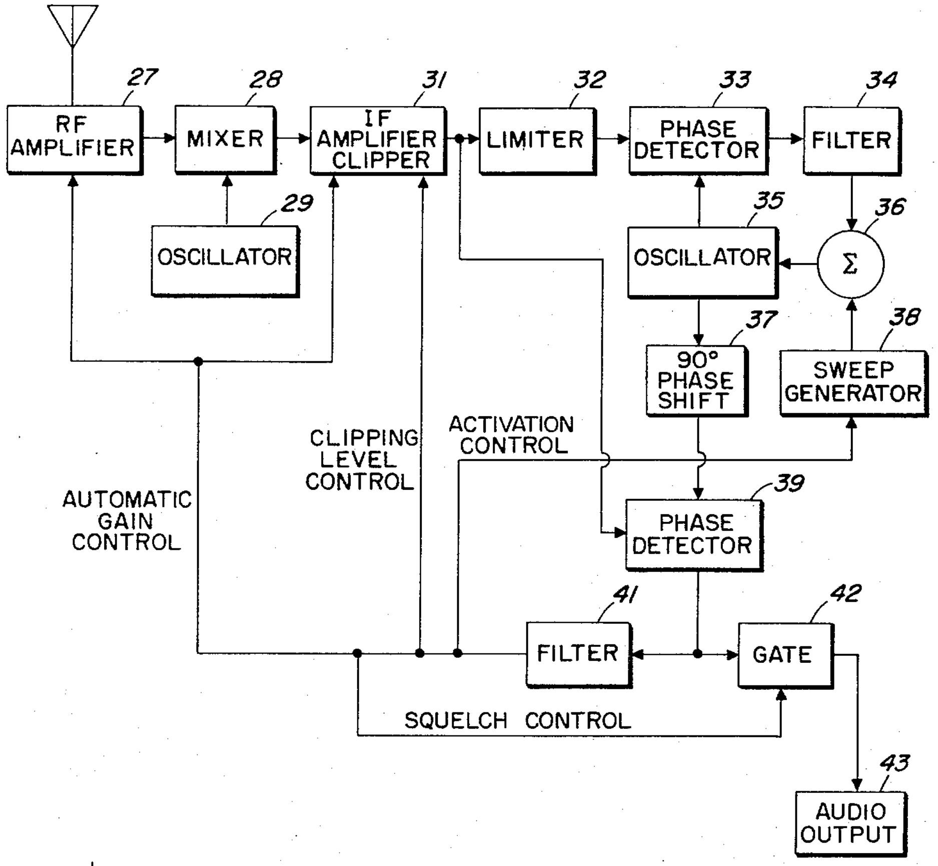
FIGURE 4 shows a receiver which is used in a SSB system having a suppressed carrier.

The operation of the receiver is described with the aid of FIG. 4. The R.F. amplifier 27, mixer 28 and oscillator 29 perform their normal function for a superheterodyne receiver. The I.F. amplifier clipper 31 performs the normal I.F. amplifier function but also includes a clipper with an adjustable clipping level to remove all amplitude peaks exceeding the clipping level. By controlling the clipping level by the level of the carrier component of the incoming signal all amplitude levels which exceed the carrier level more than a predetermined amount will be removed. Since the normal range by which the voice signal exceeds the carrier level is determinable, the clipping level may be set so as to pass the voice peaks but remove any peaks exceeding the voice peaks. Thus the very high amplitude impulse peaks will have their level reduced to the voice peaks and, because they are normally very short pulses, most of the noise energy will be removed.

Limiter 32, phase detector 33, filter 34, and oscillator 35 constitute a phase tracking loop in which the oscillator 35 is locked 90° out of phase with the incoming carrier signal. By designing the phase locked loop with a narrow band pass it is immune to sideband signals. The output of oscillator 35 is shifted in phase 90° by phase shift network 37 to put it in phase with the received carrier. The output of phas shift network 37 is applied to phase detector 39 along with the clipped signal from I.F. amplifier clipper 31.

D.C. output of phase detector 39 then is a measure of the amplitude of the received carrier and is used to provide automatic gain control to the R.F. 27 and I.F. 31 amplifiers and to adjust the clipping level in the I.F. amplifier 31. It is also used at the squelch control to gate 42 to control the audio out of the receiver when the carrier is present. The phase detector 39 may also be used as a mixer to provide the desired audio output as shown in the diagram. It should be noted that a separate mixer may be used to mix the reference signal from oscillator 35 and the incoming signal from I.F. amplifier 31 to obtain the desired audio signal if this is preferred. The D.C. output from phase detector 39 is also used as a lock indicator to activate the sweep generator 38 when it is not in lock and to inactivate it when lock is achieved. If the amount of error that may exist between the frequency of the received carrier and the receiver oscillator is small, the sweep generator 38 may be omitted and the normal pull in range of the phase locked loop 32, 33, 34, 35 will provide the capture function. However, if the frequency error that may exist between the received carrier and the receiver oscillator 35 may exceed the pull in range of the phase locked loop, the sweep voltage from the sweep generator 38 will be added to the oscillator frequency control voltage to sweep oscillator 35 across the frequency range in which the received carrier may fall. When the phase lock between the carrier and oscillator 35 has been established there will be a D.C. output from phase detector 39 which after filtering off the A.C. components by filter 41 is used to inactivate the sweep generator 38.

Laboratory measurements indicate that at a frequency removed 10 times the 3 db loop bandwidth (16 c.p.s. 3 db bandwidth was used) an interfering sine wave has to be 15 db stronger than the desired signal in order to knock the loop out of lock while at 5 times the loop bandwidth it had to be about 10 db stronger than the desired sine wave. This can be improved considerably by inserting a band-pass filter in front of the limiter since the presence of the undesired signal reduces the amplitude of the desired signal coming out of the limiter so that a reduction in the total amount of undesired signal arriving at the limiter will improve the system.

Figure 5:
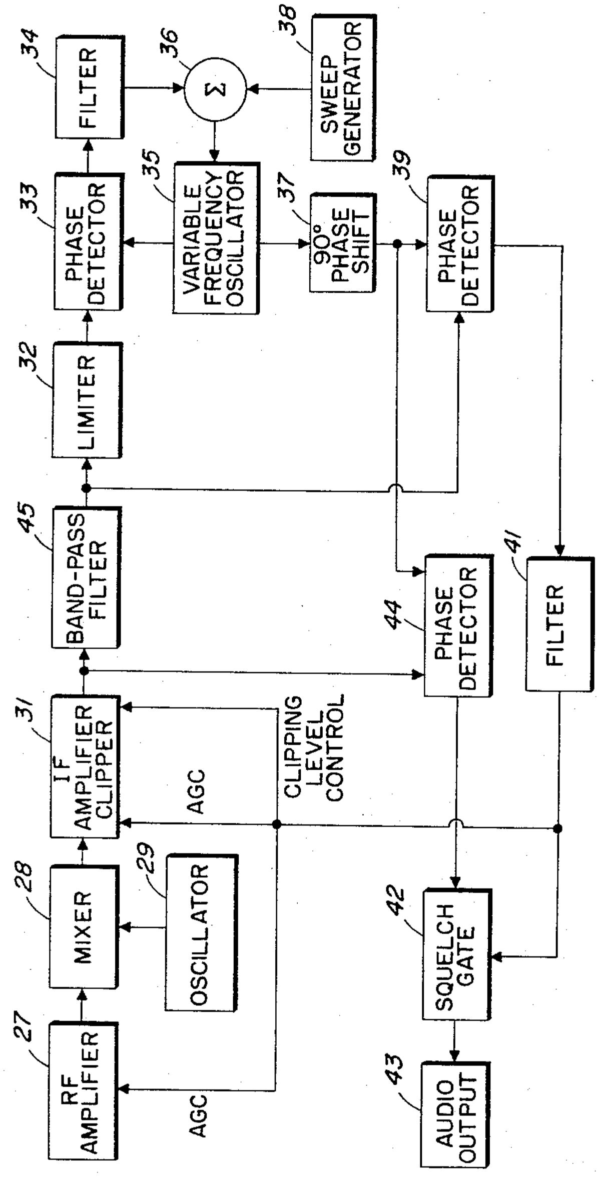
FIGURE 5 shows a modified embodiment of the receiver shown in FIGURE 4.

Such a system is shown in FIGURE 5. This system is identical to the system of FIGURE 4 but additionally includes band-pass filter 45 and phase detector 44. Band-pass filter 45 is constructed to pass the incoming carrier signals while filtering most of the sideband signals. It thereby improves the system by assuring that limiter 32 is protected from sideband frequencies. The tendency of the sideband signals to reduce the carrier output of the limiter is thereby reduced. This reduces the susceptibility of the phase locked loop to being knocked out of lock. The addition of band-pass filter 45 makes it necessary to add phase detector 44. This is so because the sideband signals will not pass filter 45. This eliminates the audio from the signal applied to phase detector 39. However, by adding phase detector 44 to the system and by feeding detector 44 with the I.F. clipper 31 output the audio (sideband) is present at audio output 43 through squelch gate 42. Although the addition of band-pass filter 45 reduces the susceptibility of the locked loop, the system of FIGURE 4, which does not utilize the filter, is quite adequate. As stated hereinabove, the interfering signal must be 15 db stronger than the carrier to knock the loop out of lock. Also, since in a single sideband signal of the type under consideration the sideband signals will not be sine waves and most of the energy will be many times the loop bandwidth away (the energy from speech is spread over considerable bandwidth) the probability of the system described maintaining lock is excellent even when the band-pass filter 45 is not employed and limiter 32 is. As explained above, the carrier can be turned on first at the beginning of transmission to allow the phase locked loop to lock before the single sideband is added. It should also be mentioned that the carrier can be transmitted at full strength briefly at the beginning of the transmission to facilitate the locking of the phase locked loop. Then the carrier can be reduced and the single sideband information added. A system for doing this is shown in FIGURE 7.

Figure 7:
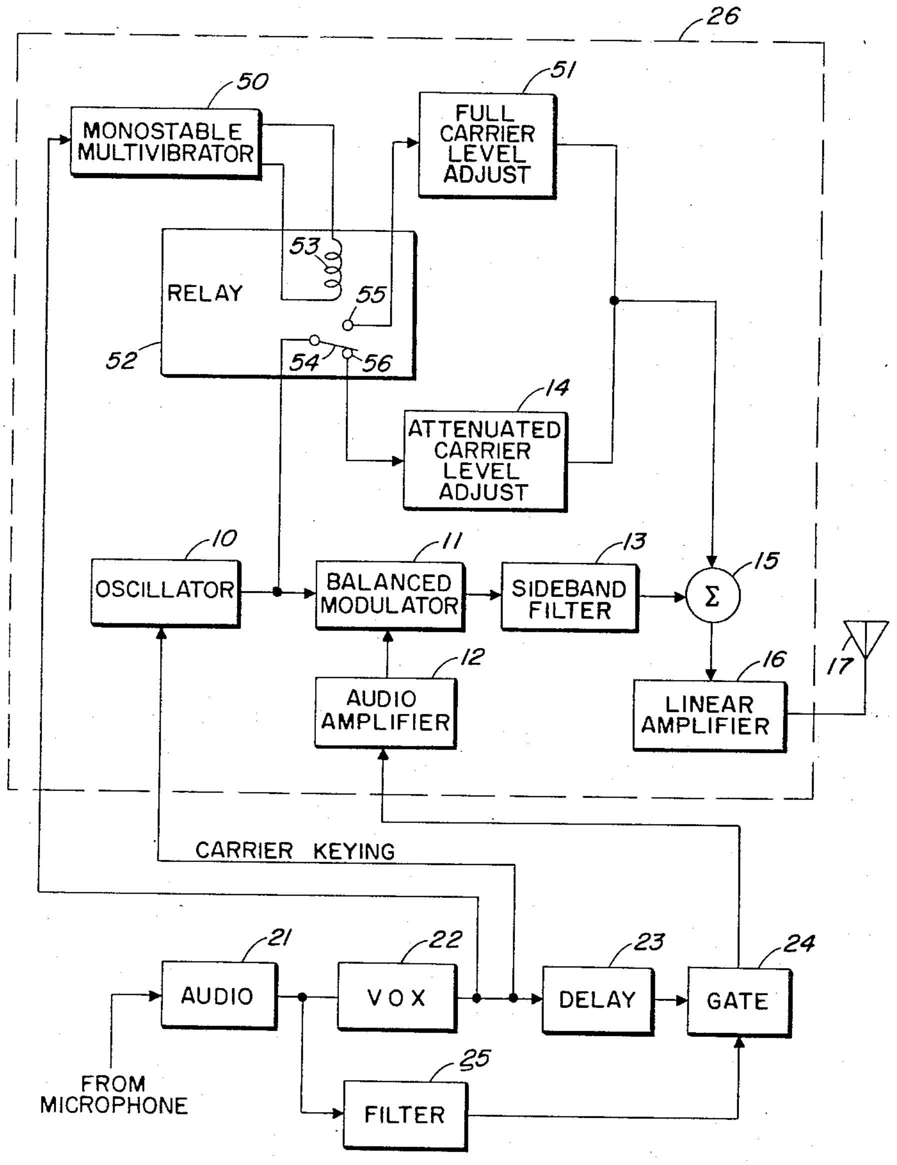
FIGURE 7 shows a transmitter which initially transmits an unsuppressed carrier.

The system shown in FIGURE 7 is identical to that shown in FIGURE 3 but transmitter 26 is shown in more detail. Transmitter 26 shown in FIGURE 7 is identical to the transmitter of FIGURE 1 with monostable multivibrator 50, full carrier adjust 51 and relay 52 added. Multivibrator 50 is triggered at the same time as oscillator 10 is turned on by the VOX 22 output. Multivibrator 50 actuates coil 53 of relay 52 and attracts arm 54 to contact 55. With arm 54 in this position the output of oscillator 10 is fed through full carrier adjust 51 so that an unattenuated carrier goes to summing network 15. Full carrier level adjust can be any means which will not significantly attenuate the carrier; this includes an ordinary conductor. After a time delay determined by the time constant of multivibrator 50 the multivibrator returns to its stable state. This deactivates coil 53 and arm 54 returns to its normal position on contact 56. This connects the output of oscillator 10 with attenuated carrier adjust 14 and an attenuated carrier is fed to summer 15. The carrier lock can be established very rapidly if the initial error is not too great. If the transmitter oscillator 10 and oscillators 29 and 35 are sufficiently accurate and stable, sweep generator 38 and adder 36 may be omitted and the system will automatically lock by being within the normal pull-in range of the phase locked loop. Under these conditions the system will automatically reacquire lock between syllables if it should be knocked out of lock.

The oscillator 29 does not have to be very close to the carrier frequency to maintain lock since this oscillator is used only to translate the R.F. carrier frequency to an I.F. carrier frequency. Thus oscillator 29 is removed from the actual incoming carrier frequency by the I.F. frequency so that the converted carrier frequency and its single sideband are amplified and filtered in the I.F. amplifier as in a normal receiver. Oscillator 35 (which will be the same frequency as the I.F. frequency) will lock to this converted carrier frequency where it has the same frequency as the received carrier after conversion to the I.F. frequency.

The entire system will now be described. Audio from the microphone (FIGURE 3) activates the VOX circuit 22, which keys on the transmitter carrier. Following a predetermined delay as established by delay 23, gate 24 supplies audio to the transmitter modulator. The transmitter 26 is built to provide a predetermined amount of attenuation of the carrier and may employ one of the methods of FIGURE 1 or FIGURE 2. Thus the transmitted signal consists of a single sideband signal and a carrier which has been attenuated a prescribed amount (such as 10 db). The carrier comes on a predetermined period of time before the single sideband signal to allow the receiver to lock.

In the receiver with the receiver oscillator and carrier frequency tolerances such that the receiver oscillator is always within the capture area of the phase locked loop, phase lock is immediately established and the magnitude of the carrier provides automatic gain control, automatic adjustment of the clipper for impulse type noise and automatic operation of the squelch circuits.

When the tolerances of the frequency of the received carrier and the receiver oscillator are not sufficiently accurate for the receiver oscillator to always be in the pull in range of the phase locked loop, then a sweep generator 38 is added. Sweep generator 38 sweeps the receiver oscillator across the range until phase lock is obtained. It is therefore evident that sweep generator 38 can be eliminated from the system, but more accurate frequency determining components are required. When phase lock is obtained as indicated by the output of phase detector 39, sweep generator 38 is deactivated. Thus there has been described a single sideband system in which the carrier is suppressed by some predetermined amount such as 10 db so that it does not significantly affect the amount of power available to the voice sideband. The receiver automatic gain control is operated by this suppressed carrier so that it is independent of the attack and decay times which cause some trouble in commonly used systems. Likewise the receiver squelch system is operated by the suppressed carrier which also makes it independent of the syllabic fluctuations of the single sideband signal. Also the clipper for clipping the high peaks of impulse type noise has its clipping level adjusted by the level of the received suppressed carrier.

It may not be immediately evident how a signal of such a low amplitude as the suppressed carrier, in comparison to the desired information, may be useful in effectively providing all of these functions. This capability results from the very small bandwidth of the phase locked loop which is so small that the noise level within this bandwidth is also small. Thus an effective signal-to-noise ratio is established within this bandwidth even though the carrier has been suppressed by 10 or 15 db. In a similar manner the bandwidth of the amplitude detector as determined by filter 41 in FIGURE 4 is so narrow as to provide a useful signal-to-noise ratio in the very narrow bandwidth although the carrier has been suppressed by 10 or 15 db. Most of the transmitted energy has been concentrated in the signal sideband and is detected in the usual manner by mixing with the receiver oscillator in phase detector 39 as shown in FIGURE 4. However, the sideband and carrier can also be detected in separate detectors 44 and 39 as shown in FIGURE 5 where control of the desired levels is obtained from detector 39.

There has been described a system which overcomes the difficulties of providing adequate squelch and reducing susceptibility to noise and at the same time assures that the receiver oscillator is the same frequency as the received carrier and eliminates the "monkey chatter" effect which occurs in single sideband systems when the local oscillator frequency differs from that of the received carrier.

Although this invention has been described with respect to particular embodiments theerof, it is not to be so limited, as changes and modifications may be made therein which are within the spirit and scope of the invention as defined by the appended claims.

I claim:

1. A single sideband receiver for receiving a suppressed carrier and a sideband comprising, an R.F. amplifier, a mixer, a bandpass filter receiving the output of said I.F. amplifier and an I.F. amplifier connected in series, an oscillator feeding said mixer, a phase lock loop for locking onto said carrier, a gate circuit, a first detector for receiving the output of said loop and said bandpass filter to control the gain of said R.F. amplifier, the output of said I.F. amplifier and the squelch of said gate, a second detector receiving the output of said I.F. amplifier and the output of said loop to control the output of said gate.

2. The receiver of claim 1 wherein said loop comprises a limiter, a third detector and a second filter connected in series, a second oscillator feeding said third detector, said second oscillator receiving the output of said second filter.

References Cited

UNITED STATES PATENTS

| | | | |
|---|---|---|---|
| 2,243,719 | 5/1941 | Peterson | 325—144 |
| 2,835,889 | 5/1958 | Dyer e al. | 325—49 X |
| 2,921,188 | 1/1960 | Ringoen | 325—330 X |
| 3,100,871 | 8/1963 | Richardson et al. | 325—330 |
| 3,152,305 | 10/1964 | Becker et al. | 325—50 |
| 3,169,221 | 2/1965 | Franchi | 325—152 X |
| 3,217,255 | 11/1965 | Broadhead et al. | 325—155 X |

OTHER REFERENCES

"Practical Single-Sideband Reception" Norgaard, Donald E.; Q St, July 1948, pp. 11–15.

JOHN W. CALDWELL, *Primary Examiner.*

B. V. SAFOUREK, *Assistant Examiner.*

UNITED STATES PATENT OFFICE

CERTIFICATE OF CORRECTION

Patent No. 3,358,234 December 12, 1967

Harris A. Stover

It is hereby certified that error appears in the above numbered patent requiring correction and that the said Letters Patent should read as corrected below.

Column 6, lines 63 to 64, strike out "a bandpass filter receiving the output of said I.F. amplifier" and insert the same after "mixer," in line 65, same column 6.

Signed and sealed this 14th day of January 1969.

(SEAL)
Attest:

Edward M. Fletcher, Jr.
Attesting Officer

EDWARD J. BRENNER
Commissioner of Patents